US006798948B2

(12) United States Patent
Delisle et al.

(10) Patent No.: US 6,798,948 B2
(45) Date of Patent: Sep. 28, 2004

(54) METHOD AND APPARATUS FOR REDUCING THE WAVELENGTH DEPENDENCY OF AN INTEGRATED OPTICAL FILTER

(75) Inventors: Vincent Delisle, Ottawa (CA); Alan J. P. Hnatiw, Stittsville (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/838,137

(22) Filed: Apr. 20, 2001

(65) Prior Publication Data

US 2001/0033714 A1 Oct. 25, 2001

Related U.S. Application Data

(60) Provisional application No. 60/198,573, filed on Apr. 20, 2000.

(51) Int. Cl.[7] .................................................. G02B 6/32
(52) U.S. Cl. .............................. 385/33; 385/47; 385/52
(58) Field of Search ............................. 385/33, 37, 31, 385/16, 18, 47, 49, 52, 15

(56) References Cited

U.S. PATENT DOCUMENTS

| 5,081,615 A | * | 1/1992 | Sunagawa ................. 369/44.12 |
| 5,905,824 A | | 5/1999 | Delisle et al. ................. 385/15 |
| 6,253,011 B1 | * | 6/2001 | Haake .......................... 385/52 |

OTHER PUBLICATIONS

"Optical Phased Array Filter Module with Passively Compensated Temperature Dependence" Heise et al. ECOC, Sep. 1998, Madrid Spain, pp. 319–320.

* cited by examiner

Primary Examiner—Rodney Bovernick
Assistant Examiner—Sung Pak
(74) Attorney, Agent, or Firm—Teitelbaum & MacLean; Neil Teitelbaum; Doug MacLean (57) ABSTRACT

The present invention relates to an optical filter comprising an integrated wavelength dispersive element having an input for providing temperature compensation, particularly for providing passive temperature compensation in an arrayed waveguide grating. The present invention has found that by providing an arrayed waveguide grating having a thermally responsive pivotal input structure for changing an angle of a collimated input signal launched into a focusing lens, the input point can be selected in response to changing temperature in order to compensate for thermal drift of the center wavelength. Further, the present invention has found that by providing a reflective lens assembly for focusing an input signal at a selected input point of the input planar waveguide, alignment and tuning of an input and assembly can be improved and simplified. As an additional advantage, variable coupling parameters can be incorporated into a reflective coupling including input position, waveguide taper and planar waveguide length increment to provide relatively simple tuning in an integrated device.

18 Claims, 4 Drawing Sheets

METHOD AND APPARATUS FOR REDUCING THE WAVELENGTH DEPENDENCY OF AN INTEGRATED OPTICAL FILTER

This application claims the benefit of Provisional application No. 60/198,573 filed Apr. 20, 2000.

FIELD OF THE INVENTION

The present invention relates to an optical filter comprising an integrated wavelength dispersive element having an input for providing temperature compensation, particularly for providing passive temperature compensation in an arrayed waveguide grating.

BACKGROUND OF THE INVENTION

Figure 1:
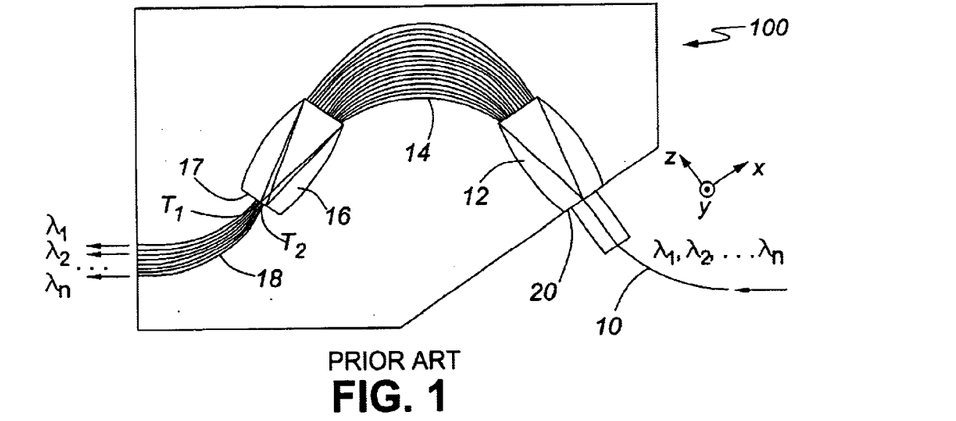
FIG. 1 is a schematic illustration of a prior art AWG having an input waveguide in the form of a fiber pigtail coupled directly to an edge of the substrate.

An arrayed waveguide grating (AWG) is a dispersive optical device used for multiplexing or demultiplexing a set of optical telecommunications channels having different wavelengths. An example of an AWG is shown in FIG. 1. The AWG 100 is an integrated optics device formed on a substrate. The AWG has at least one input waveguide 10 for launching a multiplexed signal comprising a plurality of channels at specific wavelength bands having center wavelengths $\lambda 1$ to $\lambda n$, into a free-space slab, or planar waveguide, such as a star coupler 12. The star coupler 12 distributes a wavefront of the signal evenly to a plurality of waveguides that form the grating 14. Each of the plurality of waveguides has a different optical length, the optical lengths of adjacent waveguides differing by a constant value and increasing geometrically from one side of the grating to the other. Interference caused by the relative phase differences introduced by the grating 14 occurs in a second free-space slab, or planar waveguide, such as a star coupler 16. The dispersion of the grating 14 physically separates the different wavelengths and focuses the dispersed light on an output plane 17 of the second star coupler, where separated wavelengths are coupled into a plurality of output waveguides 18. A center wavelength of a selected channel is located at a selected output waveguide 18 for optimized coupling. The center wavelength and the spacing of the individual wavelength bands of the channels are determined by the geometry of the AWG layout and by the effective refractive index of the waveguides of the grating. The output waveguides 18 determine the bandwidth of the individual channels by their width. Focus points $T1_O$ and $T2_O$ at the output plane 17 of the output planar waveguide 16 demonstrate the wavelength shift of the center wavelength that occurs as a result of a change in temperature of the device 100 with the input point fixed.

Operated in a reverse direction, multiple signals of different wavelengths are launched from the plurality of waveguides 18 and pass through the grating 14 to interfere in the star coupler 12, and be combined as a multiplexed signal into a single waveguide 10.

The position of the input waveguide 10 at the input plane 20 of the star coupler 12, from which a multiplexed signal is launched, affects the location of the focused output signals. Input waveguides have been included as a part of the integrated device. However, manufacturing tolerances are not tight enough to accurately set the center wavelength in manufacture for narrow channel spacing. The index accuracy achieved with the many deposition techniques used to make AWGs is not sufficient to set the central wavelength within the required tolerances.

In U.S. Pat. No. 5,732,171, assigned to Siemens Aktiengesellschaft, Michel et al. disclose placing the input plane of the star coupler at the edge of the substrate in which the device is formed to permit coupling a waveguide at a selected location after manufacture. Tuning may be performed to align the center wavelength of the channels of the multiplexed signal with their respective output ports to optimize coupling.

Tuning by affixing a fiber pigtail is subject to alignment error over 5 degrees of freedom. With reference to FIG. 1, X-Y-Z coordinates are shown. The X axis indicates lateral movement along the input plane 13 of the star coupler 12, which affects the center wavelength alignment. The Y axis indicates vertical movement with the planar slab, which is generally single mode in the vertical direction. Consequently fine alignment is necessary to reduce coupling losses. The Z axis indicates movement in and out from the input plane 20 of the star coupler 12. Alignment in this axis affects the pitch, or separation of the focused channel outputs on the output plane 17 of the second star coupler 16. In addition $\theta X$ and $\theta Y$ indicate rotational tilt about the X and Y axes, which will further affect tuning of the center wavelength and insertion loss.

A further problem in tuning the AWG is the temperature dependency of the device. Temperature change causes the refractive index of the phased array to change. This causes the wavelength bands of the channel outputs to shift position. Consequently, coupling to the output waveguides is not efficient at the center wavelength.

One solution to this problem is proposed by the present inventor in U.S. Pat. No. 5,905,824, which teaches providing an arrayed waveguide grating and a separate output waveguide chip optically coupled to the output planar waveguide of the AWG, with passive thermally responsive means for relative movement between them, or through an imaging lens passively positioned between them. Although this device provides passive temperature compensation, it does not provide means for adjusting the input waveguide for tuning the center wavelength.

Passive temperature compensation at the input of an AWG is proposed in a paper entitled, "Optical Phased Array Filter Module with Passively Compensated Temperature Dependence," by G. Heise et al. of Siemens AG, presented at ECOC '98, 20–24, Sep. 1998 in Madrid, Spain. Heise et al. propose supporting a fiber lens pigtail adjacent the input plane of the planar waveguide using a thermal expansion rod secured to the substrate of the AWG. The thermal expansion rod provides lateral displacement of the input fiber pigtail. However, as discussed with respect to the earlier Siemens patent, alignment of the fiber pigtail is subject to alignment and coupling error over five degrees of freedom. In order to permit lateral movement of the input pigtail, a gap between the input plane and the fiber is required. Without securing the fiber to the substrate, the likelihood of misalignment is increased. In addition, the air gap between the fiber and the input slab will increase insertion losses and introduce additional problems of back reflection.

It is desired to provide an improved coupling into an arrayed waveguide grating, which will permit variable tuning to adjust the center wavelength and provide passive temperature compensation.

It is further desired to provide an arrayed waveguide having an integrated variable input waveguides to provide tuning flexibility.

SUMMARY OF THE INVENTION

The present invention has found that by providing an integrated wavelength dispersive element having a thermally responsive pivotal input structure for changing an angle of a collimated input signal launched into a focusing lens, the input point can be selected in response to changing temperature in order to compensate for thermal drift of the center wavelength. Further, the present invention has found that by providing a reflective lens assembly for focusing an input signal at a selected input point of the input planar waveguide, alignment and tuning of an input and assembly can be improved and simplified.

Accordingly, the present invention provides an input coupling for launching light into a planar waveguide of an integrated wavelength dispersive element comprising:

focusing means having optical power for focusing light at an input point on the input plane of the planar waveguide;

an input waveguide for launching a signal comprising a plurality of channels at specific wavelengths into the integrated wavelength dispersive element;

means for coupling the signal as a beam into the focusing means; and, tilt means including a pivotal structure having a center of rotation and a thermally responsive actuator, for imparting a tilt on the beam coupled to the focusing means in response to a change in temperature.

In an alternative embodiment the present invention provides an arrayed waveguide grating comprising:

a substrate for supporting an integrated arrayed waveguide grating formed therein including:

an input planar waveguide, having an input plane at an edge of the substrate and an output plane, for propagating a wavefront from an input point on the input plane to an output plane;

a grating comprising an array of waveguides optically coupled to the output plane of the input planar waveguide for receiving the wavefront, an optical length of the waveguides differing by a substantially equal amount from a first waveguide to an nth waveguide; and, an output planar waveguide for focusing separated wavelength signals on an output plane of the output planar waveguide for coupling to output waveguides; and an input coupling for launching a signal into the integrated arrayed waveguide grating including:

at least one input waveguide;

a lens for focusing an input signal at the input point of the input planar waveguide.

means for coupling the signal as a collimated beam into the lens; and, tilt means including a pivotal structure having a center of rotation and a thermally responsive actuator, for imparting a tilt on the collimated beam at a focal plane of the lens in response to a change in temperature.

Advantageously, a passive thermally responsive input coupling is provided which also facilitates initial center wavelength tuning of the device.

As an additional advantage, variable coupling parameters can be incorporated into a reflective coupling including input position, waveguide taper and planar waveguide length increment to provide relatively simple tuning in an integrated device.

While an arrayed waveguide grating is a more commonly used integrated wavelength dispersive element used in the telecommunications industry, an echelle grating is also an integrated wavelength dispersive element equally adapted for use with the input coupling in accordance with the present invention.

BRIEF DESCRIPTION OF THE DRAWINGS

Further advantages will be clear to persons skilled in the art with reference to the following drawings showing exemplary embodiments of the invention in which.

Like numerals are used throughout to indicate like elements.

DETAILED DESCRIPTION OF PREFERRED EMBODIMENTS

Figure 2:
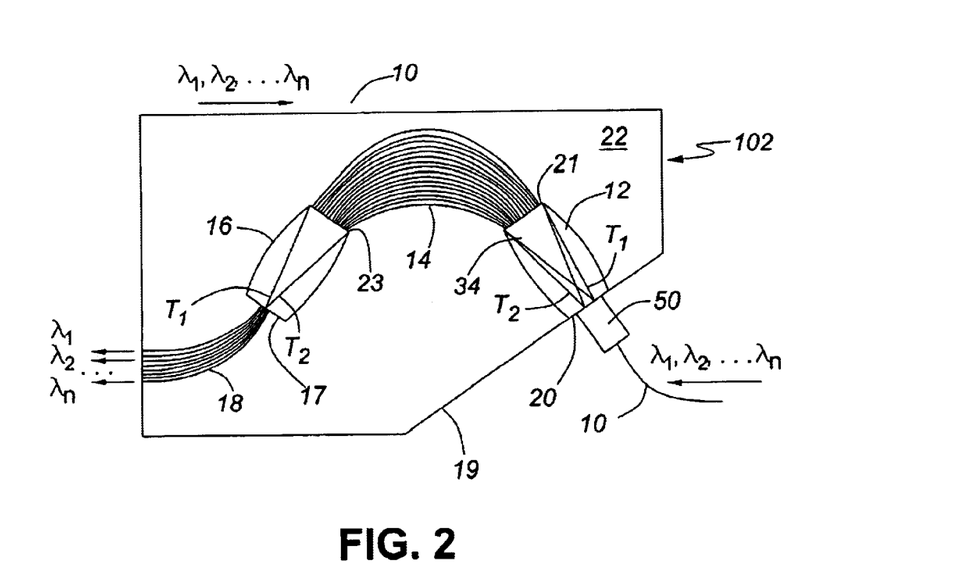
FIG. 2 is a schematic illustration of an AWG in accordance with the present invention including an athermal module input coupling coupled to the edge of the substrate.

FIG. 2 shows an AWG 102 in accordance with the present invention including an input planar waveguide 12, a grating of arrayed waveguides 14 and an output planar waveguide 16. The input planar waveguide 12 has an input plane 20 located at an edge 19 of the substrate 22 in which the integrated optical device is formed, and an output plane 21 optically coupled to the arrayed waveguides 14. Light from the waveguides 14 is coupled into the input plane 23 of the output planar waveguide 16. The output planar waveguide 16 is coupled to a plurality of output waveguides 18 at an output plane 17.

Light, comprising an optical signal including a plurality of channels at specific wavelength bands, is launched into an input waveguide 10. The fiber 10 is coupled to the input plane 20 of the input planar waveguide 12 at an input point selected to provide a maximum intensity of a desired center wavelength aligned for coupling to a selected output waveguide 18. An athermal module 50 provides an input coupling from the input waveguide 10 to the planar waveguide 12. Translation of the input point shown at $T1_I$ and $T2_I$ by the athermal input coupling 50 shifts the cone 34 of the wavefront propagating in the planar waveguide 12. At the output plane 17 of the output planar waveguide 16, $T1_O, T2_O$ indicate a maintained position of the focused center wavelength despite the temperature shift from T1 to T2.

Figure 3:
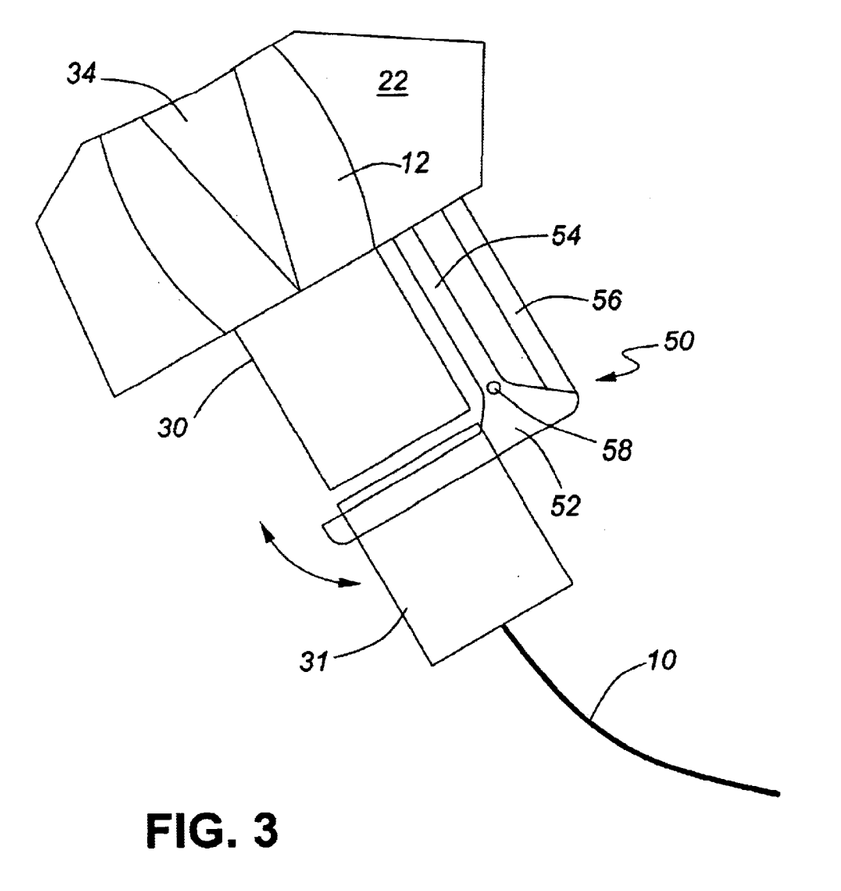
FIG. 3 is a schematic illustration of an athermal input coupling in accordance with the present invention including a pivotally mounted lens.

FIG. 3 shows an embodiment of the athermal input coupling 50 in detail. A lens 30 is coupled to the input plane 20 of the planar waveguide 12 for focusing an input signal at a selected input point. A thermally actuated pivotal structure 52 supports an additional lens 31. The pivotal structure 52 includes a first arm 54 of a material having a first coefficient of thermal expansion and a second arm 56 of a different material having a second, different coefficient of thermal expansion. Each arm 54, 56 is disposed laterally adjacent the lens 30, and abuts the substrate edge 19, or another common reference plane. The first arm 54 is fixed to, or formed integrally with the pivotal structure 52. The pivotal structure includes a pivot point 58 that forms a rotation center about which the pivotal structure 52 rotates. The pivot point 58 has an axis perpendicular to the plane of the planar waveguide 12. The second arm 56 is coupled to the pivotal structure 52 a distance from the rotation center 58, so that differential expansion of the first and second arms 54,56 causes the second arm 56 to apply leverage to the pivotal structure 52 causing it to rotate about the pivot point 58. Light launched from the input fiber 10 is collimated by the additional lens 31. If a tilt is applied by the pivotal structure 52 in response to a change in temperature, the collimated beam is coupled to the lens 30 at an angle. This angle is translated by the lens 30 as an offset, laterally displacing the focused input point at the input plane 20. Graded index, such as SELFOC™ lenses are convenient for use in the present invention, although other lenses can be used. The adjacent surfaces of the lenses 30,31 can be provided with anti-reflective coatings to reduce back reflections. The materials of the arms 54,56 are selected to provide a rotation in response to a change in temperature, which will compensate for the wavelength shift of the AWG device over the same temperature change. Where an exact expansion coefficient is not available to match the thermal compensation required, the axis of the pivot point 58 can be rotated slightly away from perpendicular in order to adjust the distance of the input shift in response to temperature change. This does increase insertion losses, but only by a small amount. Advantageously, this structure makes use of passive actuation. Of course, active thermally responsive actuators such as a controller in combination with a piezoelectric, magnetic or motor actuator can also be used.

Figure 4:
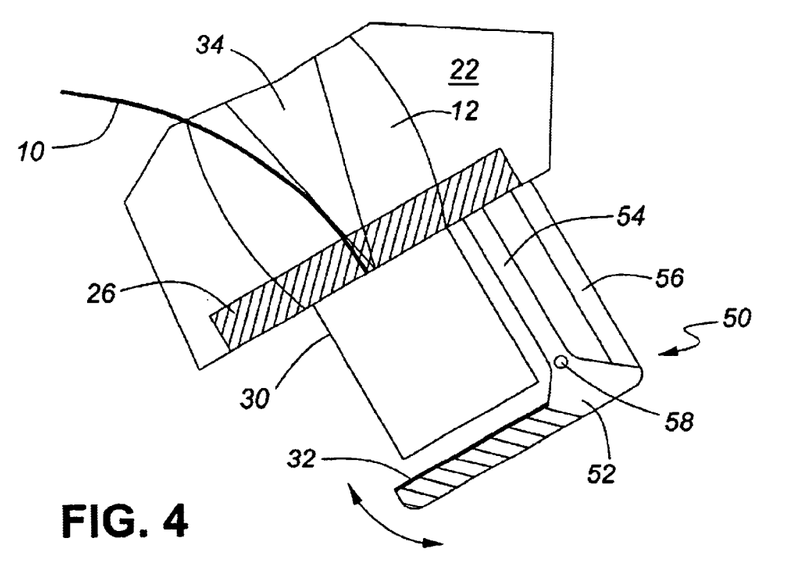
FIG. 4 is a schematic illustration of a further embodiment of the athermal input coupling in accordance with the present invention including a pivotally mounted mirror.

As shown in FIG. 4, coupling is provided through a reflective lens assembly including a lens 30 and a reflective element 32, such as a mirror. The input waveguide 10 is supported above the substrate 22 in which the integrated device is formed, by a glass block 26. The glass block 26 is positioned above the surface of the planar waveguide 12, and has a front face, which is coplanar with the input plane 20. An end portion of the fiber 10 is positioned in a V-groove that aligns the fiber output perpendicular to the input plane 20 and parallel to the plane of the planar waveguide 12, with the fiber end face substantially aligned with the front face of the block 26. The lens 30 is positioned at the input plane 20 with the axis of the lens disposed symmetrically between the fiber end face and the input point. Light from the fiber 10 is launched into the lens 30 off-axis, the input light is collimated from the lens 30, and is reflected by the mirror 32. The reflected beam is focused at the input plane 20, off-axis by a symmetrical amount. The lens assembly provides a shift from the fiber 10 to the input point. The pivotal structure 52 supports the mirror 32. To reduce back reflections both the mirror 32 and the lens 30 can be provided with an anti-reflective coating. In response to temperature changes, the different materials of the support arms 54,56 expand differentially, tilting the mirror 32 about the pivotal axis 58 perpendicular to the plane of the planar waveguide 12. The tilted mirror 32 reflects the collimated input beam back into the lens 30 at an angle. The angle is translated in the lens 30 to a lateral positional offset. Thus, the input point is adjusted in response to the change in temperature.

The focal length of the lens 30 can also be adjusted to vary the focus and accordingly the input point. For instance, a graded index lens may be foreshortened to accommodate an adhesive thickness between the lens 30 and the input plane 20, or to reduce the pitch of the dispersed channels. Pitch as used throughout this document refers to the amount of spatial separation between center wavelengths of the channels on the output plane 17. Alternatively, a curved mirror having optical power and supported for pivotal movement can be used to replace the lens mirror combination described. The curved mirror reflects and focuses light from the input waveguide onto the input plane 20.

The light from the input point propagates through the input planar waveguide 12 as a wavefront forming a diverging cone 34, confined in a vertical dimension, from the input point to the output plane 21 for coupling to the array of waveguides 14. Light from the waveguide array 14 is coupled into the input plane 23 of the output planar waveguide 16, where interference among the signals is resolved as separated wavelength spots focused on the output plane 17. The wavelength spots having a center wavelength for each channel are aligned with and coupled to the output waveguides 18.

In order to align the center wavelengths of the channels to the output waveguides 18, the input waveguide 10 must be coupled to a precise input point. Through manufacturing tolerances, this point will vary from device to device. By coupling light into the device 102 through the input assembly including the input waveguide 10 and a reflective lens assembly 30,32, two of the five degrees of freedom are eliminated. The plane of the input waveguide 10 is fixed by the plane of the block 26, which removes the θX. The perpendicular orientation of the waveguide end is also fixed by the V-groove in the block 26, eliminating the θY. As mentioned above, adjustments to the lens length can provide a higher degree of positioning accuracy in the Z axis. This reduces the positioning to a simpler X-Y alignment operation. Adjustment in the X axis determines the center wavelength position. Adjustment in the Y axis affects coupling efficiency.

Figure 5:
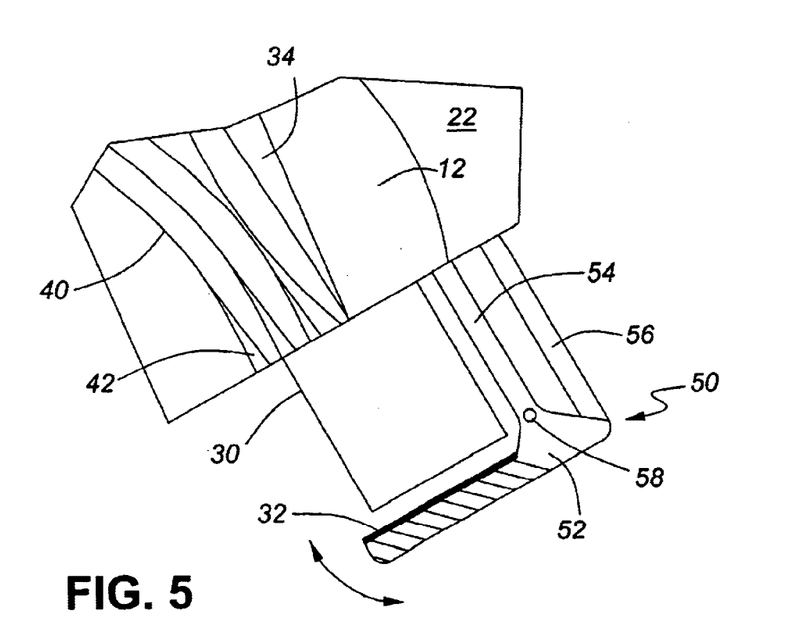
FIG. 5 is a schematic illustration of a still further embodiment of the athermal input coupling as shown in FIG. 4 including alternative integrated input waveguides; and, FIG. 6 is a schematic illustration of a further embodiment of the athermal input coupling incorporating a dual lens.

A further embodiment of the invention, shown in FIG. 5 reduces the range of X-Y displacement necessary to tune the AWG. In this embodiment, the input waveguide comprises one or more integrated waveguides 40 formed in the substrate with the AWG itself. In order to position the waveguide ends of the input waveguides 40 close to the input point, the planar waveguide 12 is reduced to its minimal dimensions to accommodate the input waveguides 40. The cone 34 of the propagating wavefront, and a range of lateral displacement about the cone to effect initial and temperature dependent tuning, defines the minimal dimensions, and input waveguides 40 can be positioned on one side or both of the cone 34 beside the modified planar waveguide 12. In this arrangement θX is fixed by the plane of the waveguide in the substrate and θY is fixed by the design of the photomask. It is preferred to launch an input signal from an integrated waveguide over fiber, because the mode field width of the integrated waveguide is well defined, providing more accurate control of the bandwidth of the device. Fiber has a mode field width accuracy of only ±10%. In the past it has been necessary to use fiber as an input waveguide to facilitate tuning. This embodiment of the present invention facilitates a design which is more compact, and easier to assemble, as the polishing and pigtailing of fibers, all at one substrate edge, can be done at the same time.

As shown in FIG. 5, the invention, when implemented with integrated input waveguides permits the integration of many different inputs with varying parameters. It is then possible to select the best input waveguide by moving the lens assembly in the X direction. The pivotal mirror structure 52 can support a mirror 32 large enough that displacement of the pivotal structure 52 is not necessary. Different parameters of the input waveguides can be varied, including the width at the end of the waveguide inputs by tapering the waveguide ends 42, as shown in FIG. 5. The taper 42 provides additional control or variation to the mode field width, and the resulting bandwidth of the device. By providing a plurality of input waveguides 40 with different taper dimensions, a best input can be selected by positioning the lens 30 symmetrically between the selected waveguide 40 and the selected input point. Additional input waveguide parameters for variable coupling can be incorporated into the reflective coupling, including input position, waveguide taper and planar waveguide length increment, to provide relatively simple tuning in an integrated device. These are discussed in detail in co-pending application 10–468 to a common assignee, herein incorporated by reference.

Advantageously, the input coupling 50 in accordance with the present invention can be implemented in combination with additional integrated optical filters in the coupling path. For instance filters can be incorporated in the mirror itself, or at either focal plane of the lens.

Figure 6:
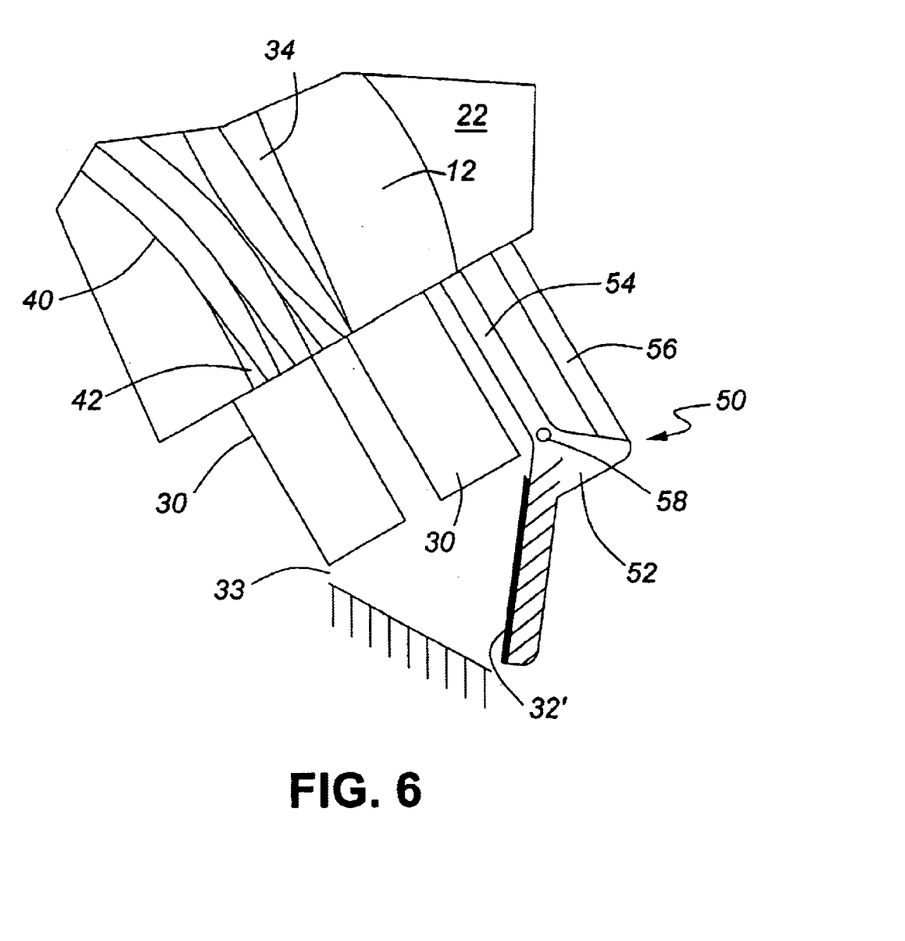

For some AWG designs, the distance between the input waveguides 40 and the input point at substantially the center of the planar waveguide 12 will be too large for a graded index lens 30. In order to increase the offset, the input coupling 50 is modified, as shown in FIG. 6, to include two lenses 30 and a fixed mirror 33 provided at an angle to direct the collimated beam to a tiltable mirror 32', which is also provided at an angle. The lenses 30 are disposed symmetrically between the selected input waveguide 40 and the input point. The pivotal structure 52 will tilt the mirror 32' in response to a change in temperature to provide thermal compensation.

Of course, equivalent tilt mechanisms for imparting a tilt to a collimated beam for launching into a lens at the input of an AWG will be apparent to the person skilled in the art. Numerous other embodiments can be envisaged without departing from the spirit and scope of the invention, which is defined in the claims.

What is claimed is:

1. An input coupling for launching a beam of light into a planar waveguide of an integrated wavelength dispersive element comprising:
    an input waveguide for launching the beam of light
    collimating means optically coupled to the input waveguide for collimating the beam of light;
    tilt means including a pivotal structure having a center of rotation and a thermally responsive actuator, for imparting a tilt on the beam of light in response to a change in temperature; and
    focusing means having optical power for receiving the beam of light from the collimating means at an input angle, and for focusing the beam of light at an input point on an input plane of the planar waveguide;
    whereby the change in temperature causes the tilt means to alter the input angle resulting in a lateral offset of the input point.

2. An input coupling as defined in claim 1, wherein the focusing means comprises a first lens, and the collimating means comprises a second lens.

3. An input coupling as defined in claim 2, wherein the pivotal structure supports the second lens for pivotal movement relative to the first lens.

4. An input coupling as defined in claim 3, wherein the first lens and the second lens are spaced apart by the pivotal structure, and each lens includes an anti-reflective coating on a surface adjacent the other lens.

5. An input coupling as defined in claim 3, wherein the integrated wavelength dispersive element comprises an arrayed waveguide grating.

6. An input coupling as defined in claim 5, wherein the input waveguide comprises optical fiber.

7. An input coupling for launching light into a planar waveguide of an integrated wavelength dispersive element comprising:
    focusing means having optical power for focusing light at an input point on the input plane of the planar waveguide;
    an input wave guide for launching a signal comprising a plurality of channels at specific wavelengths into the integrated wavelength dispersive element;
    means for coupling the signal as a beam into the focusing means; and
    tilt means including a pivotal structure having a center of rotation and a thermally responsive actuator, for imparting a tilt on the beam coupled to the focusing means in response to a change in temperature;
    wherein the focusing means comprises a lens, and the means for coupling the signal comprises a minor optically coupled to the lens for reflecting an input signal collimated in the lens.

8. An input coupling as defined in claim 7, wherein the pivotal structure supports the minor for pivotal movement relative to the lens.

9. An input coupling as defined in claim 8, wherein a surface of the lens facing the minor includes an anti-reflective coating.

10. An input coupling as defined in claim 8, wherein the integrated wavelength dispersive element comprises an arrayed waveguide grating.

11. An input coupling as defined in claim 1, wherein the thermally responsive actuator is an active actuator including a controller.

12. An input coupling for launching light into a planar waveguide of an integrated wavelength dispersive element comprising:
    focusing means having optical power for focusing light at an input point on the input plane of the planar waveguide;
    an input waveguide for launching a signal comprising a plurality of channels at specific wavelengths into the integrated wavelength dispersive element;
    means for coupling the signal as a beam into the focusing means; and
    tilt means including a pivotal structure having a center of rotation and a thermally responsive actuator, for imparting a tilt on the beam coupled to the focusing means in response to a change in temperature;
    wherein the thermally responsive actuator is a passive actuator;
    wherein the thermally responsive actuator comprises a thermally expansive element of a different material than the pivotal structure, fixedly supported at a first end and coupled to the pivotal structure at a second end for rotating the pivotal structure about the center of rotation; and
    wherein the thermally expansive element comprises:
        a support for securing the pivotal structure to the arrayed waveguide grating, formed of a first material, and
        a leverage arm fixed at a first end relative to the support and coupled to the pivotal structure at a second end at a distance from the center of rotation,
        such that relative thermal expansion of the leverage arm to the support causes the pivotal structure to rotate about the center of rotation.

13. An arrayed waveguide grating comprising:
a substrate for supporting an integrated arrayed waveguide grating formed therein including:
an input planar waveguide, having an input plane at an edge of the substrate and an output plane, for propagating a wavefront from an input point on the input plane to an output plane;
a grating comprising an array of waveguides optically coupled to the output plane of the input planar waveguide for receiving the wavefront, an optical length of the waveguides differing by a substantially equal amount from a first waveguide to an nth waveguide; and,
an output planar waveguide for focusing separated wavelength signals on an output plane of the output planar waveguide for coupling to output waveguides; and
an input coupling for launching a signal into the integrated arrayed waveguide grating including:
an input waveguide;
a lens for focusing an input signal at the input point of the input planar waveguide;
means for coupling the signal as a collimated beam into the lens; and,
tilt means including a pivotal structure having a center of rotation and a thermally responsive actuator, for imparting a tilt on the collimated beam at a focal plane of the lens in response to a change in temperature;
wherein the input waveguide is disposed on a plane substantially parallel to the input planar waveguide having a waveguide end for launching a signal into the input planar waveguide, and wherein the means for coupling comprises a reflective element supported by the tilt means optically coupled to the lens for reflecting an input signal collimated in the lens.

14. An arrayed waveguide grating as defined in claim 13, wherein the lens is symmetrically disposed between the input point and the waveguide end, the lens for providing an offset for coupling a signal propagating from the one input waveguide to the planar waveguide.

15. An arrayed waveguide grating as defined in claim 14, wherein the input waveguide comprises an integrated waveguide formed in the substrate with the integrated arrayed waveguide grating.

16. An arrayed waveguide grating as defined in claim 13, wherein the thermally responsive actuator is a passive actuator.

17. An arrayed waveguide grating as defined in claim 13, wherein the thermally responsive actuator is an active actuator including a controller.

18. An arrayed waveguide grating comprising:
a substrate for supporting an integrated arrayed waveguide grating formed therein including:
an input planar waveguide, having an input plane at an edge of the substrate and an output plane, for propagating a wavefront from an input point on the input plane to an output plane;
a grating comprising an array of waveguides optically coupled to the output plane of the input planar waveguide for receiving the wavefront, an optical length of the waveguides differing by a substantially equal amount from a first waveguide to an nth waveguide; and,
an output planar waveguide for focusing separated wavelength signals on an output plane of the output planar waveguide for coupling to output waveguides; and
an input coupling for launching a signal into the integrated arrayed waveguide grating including:
at least one input waveguide;
a lens for focusing an input signal at the input point of the input planar waveguide,
means for coupling the signal as a collimated beam into the lens; and,
tilt means including a pivotal structure having a center of rotation and a thermally responsive actuator, for imparting a tilt on the collimated beam at a focal plane of the lens in response to a change in temperature;
wherein the thermally responsive actuator comprises a thermally expansive element of a different material than the pivotal structure, fixedly supported at a first end and coupled to the pivotal structure at a second end for rotating the pivotal structure about the center of rotation; and
wherein the thermally expansive element comprises:
a support for securing the pivotal structure to the arrayed waveguide grating, formed of a first material, and
a leverage arm fixed at a first end relative to the support and coupled to the pivotal structure at a second end at a distance from the center of rotation,
such that relative thermal expansion of the leverage arm to the support causes the pivotal structure to rotate about the center of rotation.

* * * * *

UNITED STATES PATENT AND TRADEMARK OFFICE
CERTIFICATE OF CORRECTION

PATENT NO. : 6,798,948 B2
DATED : September 28, 2004
INVENTOR(S) : Delisle et al.

It is certified that error appears in the above-identified patent and that said Letters Patent is hereby corrected as shown below:

Column 8,
Lines 19, 24 and 26, "minor" should read -- mirror --.

Signed and Sealed this

Thirtieth Day of August, 2005

JON W. DUDAS
*Director of the United States Patent and Trademark Office*